United States Patent
Massepp

(10) Patent No.: US 7,287,800 B2
(45) Date of Patent: Oct. 30, 2007

(54) MOTORCYCLE TRIM

(75) Inventor: Siegfried Massepp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/524,382

(22) Filed: Sep. 21, 2006

(65) Prior Publication Data

US 2007/0013164 A1    Jan. 18, 2007

Related U.S. Application Data

(63) Continuation of application No. PCT/EP05/02527, filed on Mar. 10, 2005.

(30) Foreign Application Priority Data

Mar. 31, 2004  (DE)  ................. 10 2004 016 363

(51) Int. Cl.
   *B62J 17/00*    (2006.01)
(52) U.S. Cl. .................................... 296/78.1
(58) Field of Classification Search ............... 296/78.1; 52/208, 204.69, 220.8, 288.1
   See application file for complete search history.

(56) References Cited

U.S. PATENT DOCUMENTS

| | | | |
|---|---|---|---|
| 3,622,196 A | | 11/1971 | Sarra |
| 4,087,110 A | * | 5/1978 | Vetter ......................... 296/78.1 |
| 4,353,590 A | | 10/1982 | Wei-Chuan |
| 4,466,754 A | | 8/1984 | Poitier |
| 4,904,014 A | * | 2/1990 | Azarovitz et al. ...... 296/146.15 |
| 5,033,246 A | * | 7/1991 | Vaughan et al. ........ 52/204.597 |
| 5,658,035 A | | 8/1997 | Armstrong |
| 5,732,965 A | * | 3/1998 | Willey ........................ 296/78.1 |
| 5,866,232 A | * | 2/1999 | Gatzmanga ................. 52/716.5 |
| 6,860,074 B2 | * | 3/2005 | Stanchfield ................... 52/464 |
| 6,974,175 B2 | * | 12/2005 | Willey ........................ 296/78.1 |
| 2004/0250488 A1 | * | 12/2004 | Rodlin ......................... 52/415 |

FOREIGN PATENT DOCUMENTS

| | | |
|---|---|---|
| DE | 28 06 714 A1 | 8/1978 |
| DE | 38 29 525 A1 | 3/1989 |
| DE | 695 02 923 T2 | 1/1999 |
| FR | 2 748 445 A1 | 11/1997 |
| JP | 2000 062668 A | 2/2000 |
| WO | WO97/42070 A1 | 11/1997 |

OTHER PUBLICATIONS

International Search Report dated May 12, 2005, including an English translation of the pertinent portions (5 pages).
German Search Report dated Nov. 16, 2004, including an English translation of the pertinent portions (8 pages).

* cited by examiner

*Primary Examiner*—Kiran B. Patel
(74) *Attorney, Agent, or Firm*—Crowell & Moring LLP

(57) ABSTRACT

A motorcycle trim including a first trim part connected to a second trim part in a form-fitting manner, the first trim part and the second trim part having form-fitting elements. The form-fitting elements are configured such that when they are engaged with one another, a clamp-like element, extending around the two form-fitting elements may be installed to secure the trim parts against release.

20 Claims, 1 Drawing Sheet

MOTORCYCLE TRIM

This application is a continuation application of International application PCT/EP2005/002527 filed Mar. 10, 2005 and claims the priority of German application No. 10 2004 016 363.4, filed Mar. 31, 2004, the disclosure of which are expressly incorporated by reference herein.

BACKGROUND AND SUMMARY OF THE INVENTION

The invention The present invention relates to a motorcycle trim and in particular to securing form-fitting elements thereof.

Modern motorcycles usually have a trim formed by multiple individual trim parts. The trim consists first of opaque trim parts, which are often painted in the color of the motorcycle, and a transparent windshield arranged in the area of the handlebars. On many motorcycles, the windshield is bolted tightly by fastening bolts to separate "trim holding elements" or other trim elements. Boreholes with bolts inserted into the boreholes are usually provided in the windshield for tightening the windshield. Since all the trim is exposed to heavy vibrations during operation, there is the risk of cracks developing in the windshield in the area of the boreholes.

The object of this invention is to create a motorcycle trim, in which individual trim parts are joined together easily and the risk of cracking at the connection points is minimized.

The invention is directed to a motorcycle trim in which a first trim part and a second trim part are provided and joined together in a form-fitting manner. The first trim part may be a transparent windshield and the second trim part may be an opaque plastic part of the remaining motorcycle trim or vice versa. The core of this invention consists of the fact that a first form-fitting element is provided on the first trim part and a second form-fitting element is provided on the second trim part, whereby the second form-fitting element is inserted in a form-fitting manner into the first form-fitting element and a clamp-like element is provided, extending around the two form-fitting elements and securing them to prevent their release.

The trim parts are preferably made of plastic. The form-fitting elements are preferably attached in one piece to the trim parts. The form-fitting elements can be manufactured by an injection molding process together with the respective trim part.

The first form-fitting element may be formed by a cuboidal section integrally molded on the first trim part and two wing-like sections protruding laterally away from the former section. While the cuboidal section is attached to the first trim part, the wing-like sections are each arranged a distance away from the first trim element. In other words, a gap is provided between the first trim part and the wing-like sections attached to the cuboidal section.

The second form-fitting element is preferably designed to be complementary to the first form-fitting element. The second form-fitting element may be formed by two angle-type and/or hook-type elements. The two angle-type and/or hook-type elements are arranged with a distance between them. This distance is large enough so that the cuboidal section of the first form-fitting element can just be inserted between the two angle-type elements. A first leg of the angle-type elements is attached to the second trim part. A second leg of the angle-type elements protrudes laterally from the respective first leg at a distance from the second trim part. If the two form-fitting elements are inserted one inside the other, then the laterally protruding legs of the angle type elements are each aligned with the wing-like sections of the first form-fitting elements.

According to one refinement of this invention, the clamp-like element has two pairs of spring arms. Each spring arm pair is U-shaped in a side view of the clamp-like element. In the installed state of the motorcycle trim, one leg of an angle-type element and one wing-like section of the first form-fitting element are each clamped between each of the pairs of spring arms.

Other objects, advantages and novel features of the present invention will become apparent from the following detailed description of the invention when considered in conjunction with the accompanying drawings for example.

DETAILED DESCRIPTION

Figure 1:
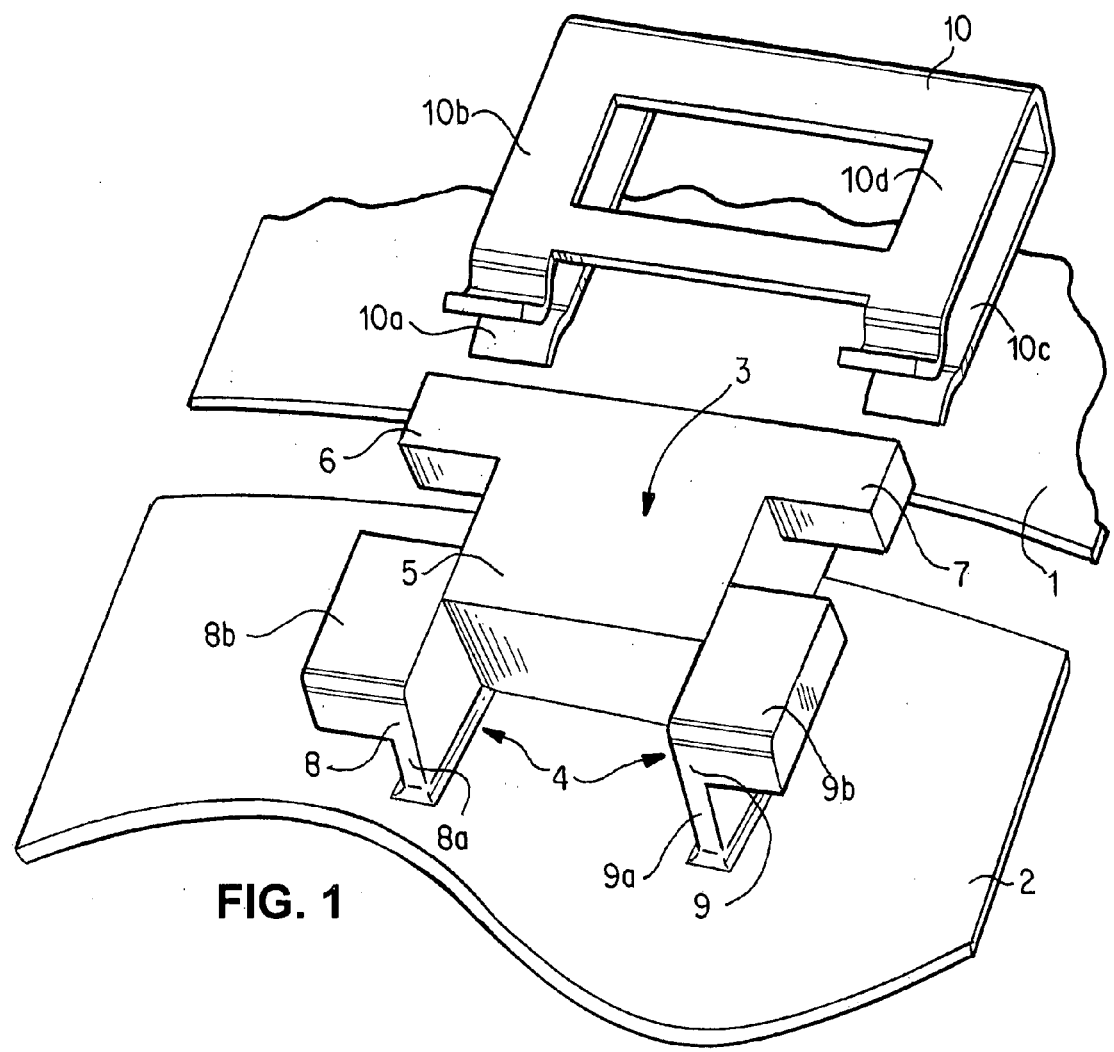
FIG. 1 is an oblique view of an embodiment of a motorcycle trim in accordance with the present invention.
Figure 2:
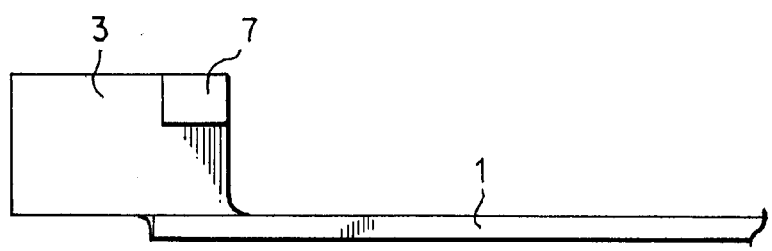
FIG. 2 showing a side view of a first trim part and first trim element of the motorcycle trim of FIG. 1.

FIG. 1 illustrates the basic principle of the invention. A motorcycle trim according to this invention has a first trim part 1 and a second trim part 2. The two trim parts 1, 2 are preferably manufactured from plastic. The first trim part 1 may be a windshield, for example, made of a transparent material. The second trim part may be a plastic part made of an opaque material or an enameled plastic part. A first form-fitting element 3 is attached in one piece to the first trim part 1. A second form-fitting element 4 is attached in one piece to the second trim part 2.

The form-fitting elements 3, 4 may be integrally molded on the respective trim part 1. The first form-fitting element 3 is a cuboidal (i.e., rectangular) central section 5 which is integrally molded directly onto the first trim part and has two wing-like sections 6, 7 protruding laterally away from the cuboidal central section 5. The wing-like sections 6, 7 are not attached directly to the trim part 1 but instead are at a distance from the trim part 1.

The second form-fitting element 4 is formed by a first angle-type element 8 and a second angled element 9. The two angle-type elements each have a first leg 8a and/or 9a attached in one piece to the second trim part 2 and a second leg 8b and/or 9b protruding at a right angle away from the respective first leg 8a and/or 9a. As FIG. 1 shows, a gap is also provided between the two second legs 8b and/or 9b and the second trim part 2. The two angle-type elements 8, 9 are spaced a distance apart so that the cuboidal central section of the form-fitting element 3 can be inserted tightly between the two first legs 8a and 9a.

FIG. 1 shows the two trim parts 1, 2 in a condition shortly prior to assembling the two form-fitting elements 3, 4. In the installed state, the wing-like section 6 and the second leg 8b as well as the wing-like section 7 and the second leg 9b are aligned. After assembling the two form-fitting elements 3, 4, a clamp-like element 10 is pushed onto the wing-like sections 6, 7 and the second legs 8b, 9b. In a side view, this clamp-like element is U-shaped and has two pairs of spring arms, each formed by two spring arms 10a, 10b and 10c, 10d. In the installed state, the spring arms 10a and 10b reach around the wing-like section 6 and the first leg 8b. In the installed state, the spring arms 10c and 10d reach around the wing-like section 7 and the first leg 9b. The two trim parts 1, 2 are thus joined together in a form-fitting manner via the form-fitting elements 3, 4 and the clamp-like element 10 in the installed state and are thereby secured against release.

An important advantage of such a connection of the two trim parts 1, 2 is that it eliminates the need for any type of boreholes and/or bolts. Assembly and disassembly are easily performed by hand.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle trim, comprising:
    a first trim part;
    a second trim part configured to be connected in a form-fitting manner to the first trim part;
    a first form-fitting element on the first trim part;
    a second form-fitting element on the second trim part; and
    a clamp element,
    wherein when the first and second trim parts are fitted together, the first form-fitting element engages the second form-fitting element, and
    the clamp element is configured in a manner which permits the clamp element to be installed around the form-fitting elements when the form-fitting elements are engaged with one another, and which secures the form-fitting elements against release.

2. A motorcycle trim as claimed in claim 1, wherein the first form-fitting element is connected in one piece to the first trim part,
    the second form-fitting element is connected in one piece to the second trim part, and
    the trim parts and the form-fitting elements are made of plastic.

3. A motorcycle trim as claimed in claim 1, wherein the first form-fitting element has a rectangular-shaped central section and two wing-like sections protruding away from the central section on opposite sides of the central section.

4. A motorcycle trim as claimed in claim 2, wherein the first form-fitting element has a rectangular-shaped central section and two wing-like sections protruding away from the central section on opposite sides of the central section.

5. A motorcycle trim as claimed in claim 3, wherein a gap is provided between each of the wing-like sections and the first trim element.

6. A motorcycle trim as claimed in claim 4, wherein a gap is provided between each of the wing-like sections and the first trim element.

7. A motorcycle trim as claimed in claim 5, wherein the second form-fitting element is formed by two angle-shaped elements arranged with a distance apart corresponding to a width of the rectangular central section of the first form-fitting element.

8. A motorcycle trim as claimed in claim 6, wherein the second form-fitting element is formed by two angle-shaped elements arranged with a distance apart corresponding to a width of the rectangular central section of the first form-fitting element.

9. A motorcycle trim as claimed in claim 7, wherein each of the angle-shaped elements has a first leg connected to and extending away from the second trim part and a second leg protruding laterally away from the first leg.

10. A motorcycle trim as claimed in claim 8, wherein each of the angle-shaped elements has a first leg connected to and extending away from the second trim part and a second leg protruding laterally away from the first leg.

11. A motorcycle trim as claimed in claim 9, wherein a gap is provided between the laterally protruding second legs and the second trim element.

12. A motorcycle trim as claimed in claim 10, wherein a gap is provided between the laterally protruding second legs and the second trim element.

13. A motorcycle trim as claimed in claim 9, wherein one of the second legs is aligned with one of the wing-like sections when the form-fitting elements are engaged.

14. A motorcycle trim as claimed in claim 10, wherein one of the second legs is aligned with one of the wing-like sections when the form-fitting elements are engaged.

15. A motorcycle trim as claimed in claim 13, wherein the clamp element has two pairs of spring arms, and when installed on the engaged form-fitting elements, one of the wing-like sections and one of the second legs is clamped between each of the pairs of spring arms.

16. A motorcycle trim as claimed in claim 14, wherein the clamp element has two pairs of spring arms, and when installed on the engaged form-fitting elements, one of the wing-like sections and one of the second legs is clamped between each of the pairs of spring arms.

17. A motorcycle trim as claimed in claim 15, wherein the clamp-like element is U-shaped.

18. A motorcycle trim as claimed in claim 16, wherein the clamp-like element is U-shaped.

19. A motorcycle trim as claimed in claim 17, wherein one of the trim parts is a transparent windshield and the other of the trim parts is an opaque plastic part.

20. A motorcycle trim as claimed in claim 18, wherein one of the trim parts is a transparent windshield and the other of the trim parts is an opaque plastic part.

* * * * *